Jan. 7, 1936.   H. B. FLOOD   2,027,272
COFFEE MAKING DEVICE
Filed Feb. 13, 1934
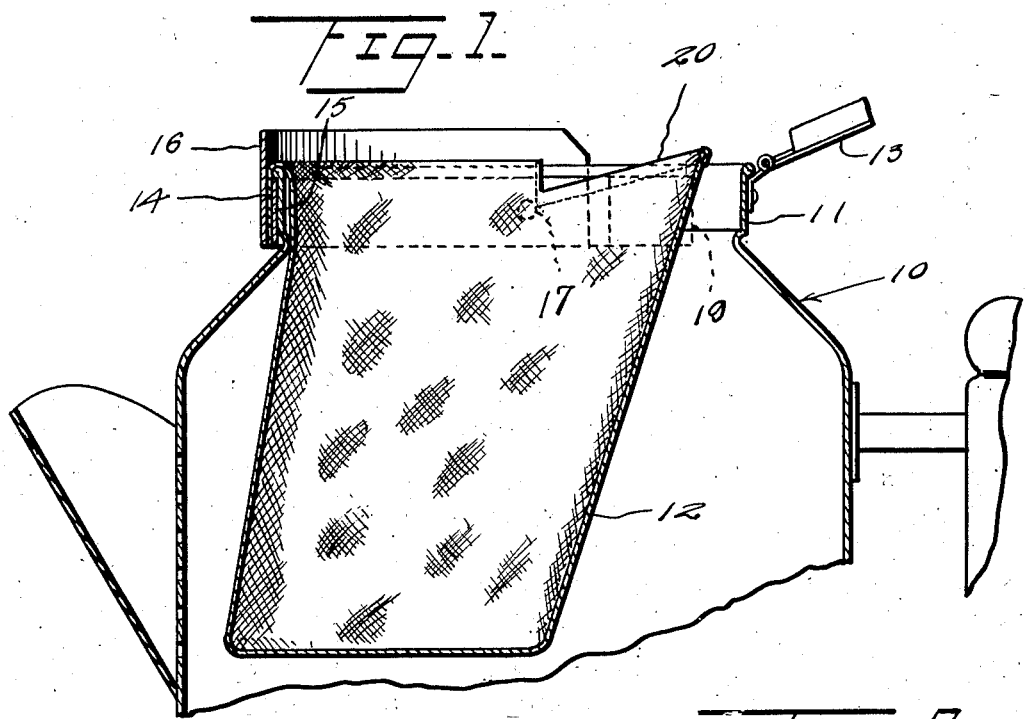
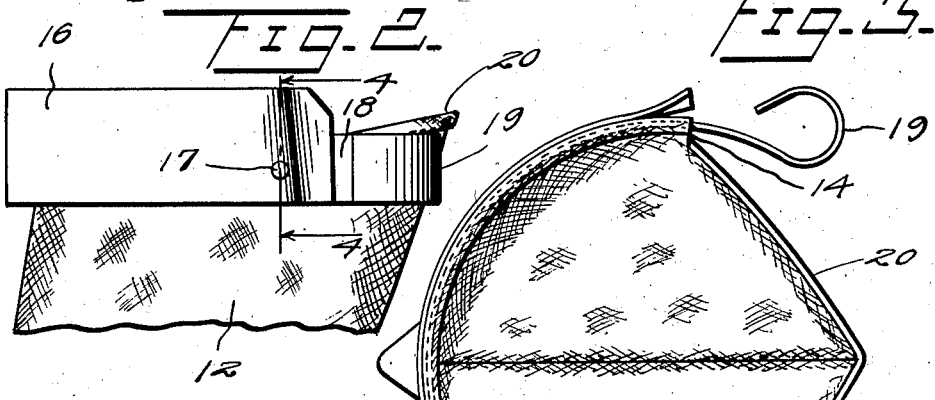
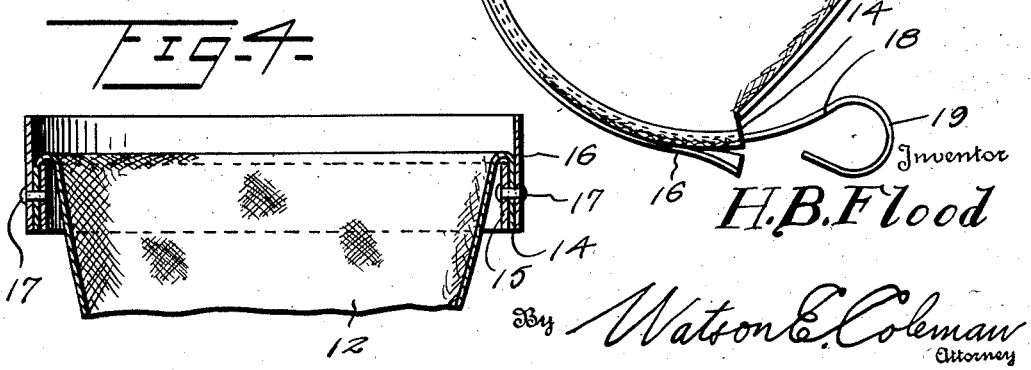

Patented Jan. 7, 1936

2,027,272

UNITED STATES PATENT OFFICE 2,027,272

COFFEE MAKING DEVICE

Herbert Bower Flood, Cambridge, Ohio

Application February 13, 1934, Serial No. 711,040

3 Claims. (Cl. 210—162)

This invention relates to coffee making devices and more particularly to a means which can be mounted in a conventional coffee pot or percolator for the purpose of making drip coffee.

An object of this invention is to provide a coffee ground holding means which can be detachably secured to the coffee pot or percolator and which is of a size to hold the desired quantity of grounds and at the same time permits the easy pouring of coffee from the coffee pot or percolator without removing the ground holding member from the pot or percolator.

Another object of this invention is to provide a coffee ground holding means which is so constructed that it will readily adapt itself to coffee urns having different sized necks.

The above and various other objects and advantages of this invention will in part be described and in part be understood from the following detailed description of the present preferred embodiment, the same being illustrated in the accompanying drawing wherein:—

Figure 1 is a vertical section taken substantially through the center of a device constructed according to the preferred embodiment of this invention mounted in a coffee urn or percolator, which is shown in fragmentary sectional form.

Figure 2 is a fragmentary detail side elevation of the device removed from the percolator.

Figure 3 is a top plan view of the device.

Figure 4 is a sectional view taken on the line 4—4 of Figure 2.

Referring to the drawing wherein like numerals of reference designate corresponding parts throughout the several views, the numeral 10 designates generally a coffee urn or percolator which has a neck 11 and a lid 13 adapted to close the open top of the pot or body 10. This construction is conventional construction and is shown here only for the purposes of illustration.

In order to provide a means whereby the pot 10 may be adapted for use in the making of drip coffee with boiling water without submerging the coffee grounds in the boiling water, I have provided a coffee ground holding bag 12 which is of a suitable length and size so as to substantially close the open top portion of the neck 11.

The coffee holding bag 12 is formed by sewing two pieces of cloth or the like together and forming an extension 14 for a distance substantially greater than one-half the circumference of the bag, and this extension 14 is clamped between an inner clamping member 15 and an outer clamping member 16. Securing members 17 extend through the clamping members 15 and 16 and through the extension 14 so as to securely hold the bag 12 against movement relative to the attaching means comprising the two clamping members 15 and 16. The inner clamping member 15 is relatively longer than the outer clamping member 16, having an extension 18 at each end thereof terminating in a loop or eye 19. The loops 19 constitute means whereby the resilient clamping members 15 and 16 may be spread apart a sufficient distance to permit the engagement and removal of the device from the neck 11.

The extension 14 of the bag body 12 engages over the upper edge of the inner clamping member 15 and as will be noted from the drawing, the outer strap or clamping member 16 is wider than the inner clamping member 15, so that when the lid 13 is in closed position, the outer clamping member 16 will project above the edge of the lid and act as a guard. The bag 12 between the extensions 18 is unattached or free, as at 20, and this free or unattached portion is disposed in confronting relation to the hinged portion of the lid 13 and also provides a means whereby the bag may be stretched laterally to accommodate different sized necks in coffee pots.

As will be noted from the Figures 1 and 2 of the drawing, the bag 12 is mounted in a downwardly and forwardly inclined position with the lower portion of the bag 12 extending in the direction of the pouring spout of the percolator or urn 10.

In the use of this device, the coffee grounds are placed on the inside of the bag 12 either before or after the bag is placed in the urn or percolator 10, whereupon the bag 12 is placed through the neck 11 in the percolator or urn 10 and the spring 15 is spread apart by pulling the eyes 19 outwardly so that the clamping members 15 and 16 will resiliently engage about the periphery of the neck 11 with the bag 12 suspended on the inside of the percolator. The boiling water may then be poured into the bag 12 and the water will pass through the bag into the body of the percolator 10 after the manner of the drip coffee making devices. It is to be understood that the form of my invention herewith shown and described is to be taken as a preferred embodiment of my invention and that various changes in the shape, size and arrangement of parts may be resorted to without departing from the spirit of my invention or the scope of the subjoined claims.

Having thus described my invention, I claim:

1. A device as set forth, comprising a bag, an arcuate resilient clamping member having a length greater than a semi-circle whereby to yieldably engage about the neck portion of a percolator, an arcuate shield member, and an extension carried by the bag disposed between the clamping member and the shield.

2. A means for suspending coffee within a percolator, comprising a coffee holding bag adapted to be disposed within the upper portion of the percolator, an arcuate resilient clamping member having a length greater than a semi-circle and engageable with the exterior portion of the neck of the percolator, an extension carried by the bag and engaging said clamping member, said extension when the bag is in applied position within the percolator engaging over the upper portion of the neck of the percolator, a second arcuate member, and means for securing said extension between said arcuate members.

3. A means for suspending coffee within the upper portion of a percolator, comprising a bag adapted to be disposed within the upper portion of the percolator, an arcuate resilient clamping member provided with outturned opposite end portions and having a length greater than a semi-circle whereby to yieldably and detachably engage the outer portion of the neck of the percolator, an extension integral with the bag, an arcuate shield member having a width greater than the width of said clamping member, and means for securing said extension between said clamping member and said shield.

HERBERT BOWER FLOOD.